(12) United States Patent
Jennings et al.

(10) Patent No.: US 10,936,627 B2
(45) Date of Patent: Mar. 2, 2021

(54) SYSTEMS AND METHODS FOR INTELLIGENTLY GROUPING FINANCIAL PRODUCT USERS INTO COHESIVE COHORTS

(71) Applicant: INTUIT INC., Mountain View, CA (US)

(72) Inventors: James Jennings, San Diego, CA (US); Yao Morin, San Diego, CA (US); Joseph B. Cessna, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 728 days.

(21) Appl. No.: 15/796,594

(22) Filed: Oct. 27, 2017

(65) Prior Publication Data

US 2019/0130016 A1    May 2, 2019

(51) Int. Cl.
| | | |
|---|---|---|
| G06F 16/00 | (2019.01) | |
| G06F 16/28 | (2019.01) | |
| G06F 16/22 | (2019.01) | |

(52) U.S. Cl.
CPC ........ G06F 16/285 (2019.01); G06F 16/2246 (2019.01)

(58) Field of Classification Search
CPC .. G06F 16/2246; G06F 16/285; G06F 16/355; G06K 9/6222
USPC ...................................................... 707/738
See application file for complete search history.

(56) References Cited

U.S. PATENT DOCUMENTS

| | | | |
|---|---|---|---|
| 9,798,797 B2 | 10/2017 | Cheng et al. | |
| 2006/0059028 A1* | 3/2006 | Eder .................. | G06Q 30/0202 705/7.12 |
| 2011/0055210 A1 | 3/2011 | Meredith et al. | |
| 2014/0337347 A1 | 11/2014 | Cheng et al. | |
| 2017/0011328 A1 | 1/2017 | Zhao et al. | |
| 2017/0024358 A1 | 1/2017 | Dunstone | |
| 2017/0293625 A1 | 10/2017 | Nachlieli et al. | |

OTHER PUBLICATIONS

Agrawal et al., "Automatic Subspace Clustering of High Dimensional Data for Data Mining Applications", IBM Research Center, 2005.
Goil et al., "MAFAI: Efficient and Scalable Subspace Clustering for Very Large Data Sets", Technical Report No. CPDC-TR-9906-010, Jun. 1999.
International Search Report/ Written Opinion issued to PCT/US2018/045738 dated Nov. 28, 2018.

* cited by examiner

*Primary Examiner* — Vincent F Boccio
(74) *Attorney, Agent, or Firm* — Patterson & Sheridan, LLP

(57) ABSTRACT

Systems and methods are provided that, in some embodiments that extract user data from at least one data warehouse. The user data is sorted within each dimension, and partitions each dimension into bins. Clusters are defined as each bin that includes user data for a number of users that exceeds a threshold. Clusters are determined for every combination of dimensions. Each combination of clusters that exceed the threshold is defined as clusters that are formed from multiple dimensions. All clusters and other clusters are stored into a cluster definition table. The clusters are used to analyze the profile of specific users.

18 Claims, 8 Drawing Sheets

SYSTEMS AND METHODS FOR INTELLIGENTLY GROUPING FINANCIAL PRODUCT USERS INTO COHESIVE COHORTS

BACKGROUND

Field of the Disclosure

Embodiments presented herein generally relate to systems and method for forming clusters and pruning clusters, and more specifically to associating a specific user with at least one unpruned cluster.

Description of the Related Art

Databases may store data of all sorts. Large databases are sometimes referred to as data warehouses. A common application for a database is to store data about users of a system. Sometimes this data is organized into user profiles, which store various data about users. As the cost of digital storage has come down, it has become common to store vast amounts of data about users. Unfortunately, simply storing vast of amounts of data is often not useful to an organization. Rather, the data needs to be analyzed to be useful. Because the quantity of the stored data is ever increasing, such analysis can be time consuming and can consume a relatively large amount of computing resources, such as processing power, network bandwidth, and memory space.

SUMMARY

Embodiments herein generally relate to forming clusters and pruning non-relevant clusters, and more specifically to associating a specific user with at least one relevant cluster.

Some embodiments herein generally relate to a computer-implemented method for processing data that includes extracting user data from at least one data warehouse. The user data is sorted into dimensions, where the dimensions are one of categorical values and numerical values. Each dimension is partitioned into bins. Clusters are defined for each bin that includes user data for a number of users that exceeds a threshold. Clusters are overlaid from every combination of dimensions and each overlaid cluster that exceeds the threshold is defined as other clusters. All clusters and other clusters are stored into a cluster definition table.

In another embodiment, a computer-implemented method for processing data, includes partitioning, into a plurality of bins, user data for each dimension in a plurality of dimensions. Clusters are defined as bins that include the user data for a number of users above a threshold. Clusters for each dimension are stored into a cluster definitions table. Clusters for every dimension combination are analyzed. Each combination is partitioned into bins. Bins that include the user data that exceeds the threshold number of users are defined as clusters. The overlaid clusters are stored in the cluster definitions table.

In yet another embodiment, a computer-implemented method for processing data, includes searching a cluster definition table having clusters for at least one associated cluster in a highest dimension for association with a specific user. The search includes omitting clusters that do not contain client cluster criteria and user characteristics for the specific user, and leaving remaining clusters. User characteristics are compared for the specific user to clusters that are in a dimension that is equal to a cluster in the highest dimension that contains the user characteristics. Decrementing the comparison, of the user specific data down to a cluster in a next highest dimension and comparing the user specific data to clusters in the next dimensional, wherein the decrementing is repeatedly done until the at least one associated cluster is found.

In another embodiment, a computer-implemented method for processing data includes receiving user data, context data, a group of clusters, and statistics for each cluster in the group of clusters. User data is compared to the statistics to calculate heuristics for each cluster in the group of clusters. Clusters are scored based upon at least one of the statistics and the user data. A heuristic is selected from the scored clusters. A cluster is selected that is closest to the selected heuristic.

Other embodiments of this disclosure are provided that include other methods and systems having features similar to the computer-implemented method described herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only certain embodiments of this disclosure and are therefore not to be considered limiting of its scope.

To facilitate understanding, identical reference numerals have been used, wherever possible, to designate identical elements that are common to the figures.

DETAILED DESCRIPTION

In the following description, numerous specific details are set forth to provide a more thorough understanding of the disclosure. As will be apparent to those skilled in the art, however, various changes using different configurations may be made without departing from the scope of the disclosure. Notably, certain details within the knowledge of a person of skill in the art may be omitted in order to avoid obscuring the disclosure. Thus, the disclosure is not considered limited to the particular illustrative embodiments shown in the specification and all such alternate embodiments are intended to be included in the scope of the appended claims.

Embodiments of systems and methods are disclosed herein for forming clusters from user data; pruning unneeded clusters; and associating a specific user's profile with the remaining clusters (i.e., after the pruning). Because databases typically hold data for many users and many types of data for those users, it can be difficult to get useful information from raw data stored in the databases. It becomes more difficult when multiple databases are accessed, which each hold data for different users or even different data for the same users. Comparing this data with data for a specific user can is not only conceptually challenging, but it consumes large amounts of computing resources, such as processing power (e.g., to compare data), network bandwidth (e.g., to access data), and storage capacity (e.g., to store data).

In order to make the analysis of data more efficient, and thereby reduce the computing resources necessary to perform the analysis, clusters of data may be formed to identify groups of users with common characteristics or attributes. The clusters themselves may be configured, for example, to exclude outliers i.e., data that falls outside defined thresholds. Because different clusters can have different data dimensions, it is further possible to prune unneeded clusters from certain analyses, which further reduces the draw on computing resources because less data needs to be examined. Thus, embodiments disclosed herein may improve the performance of devices performing data analysis by, for example, reducing a data set significantly without significantly reducing the information in that data set.

Figure 1:
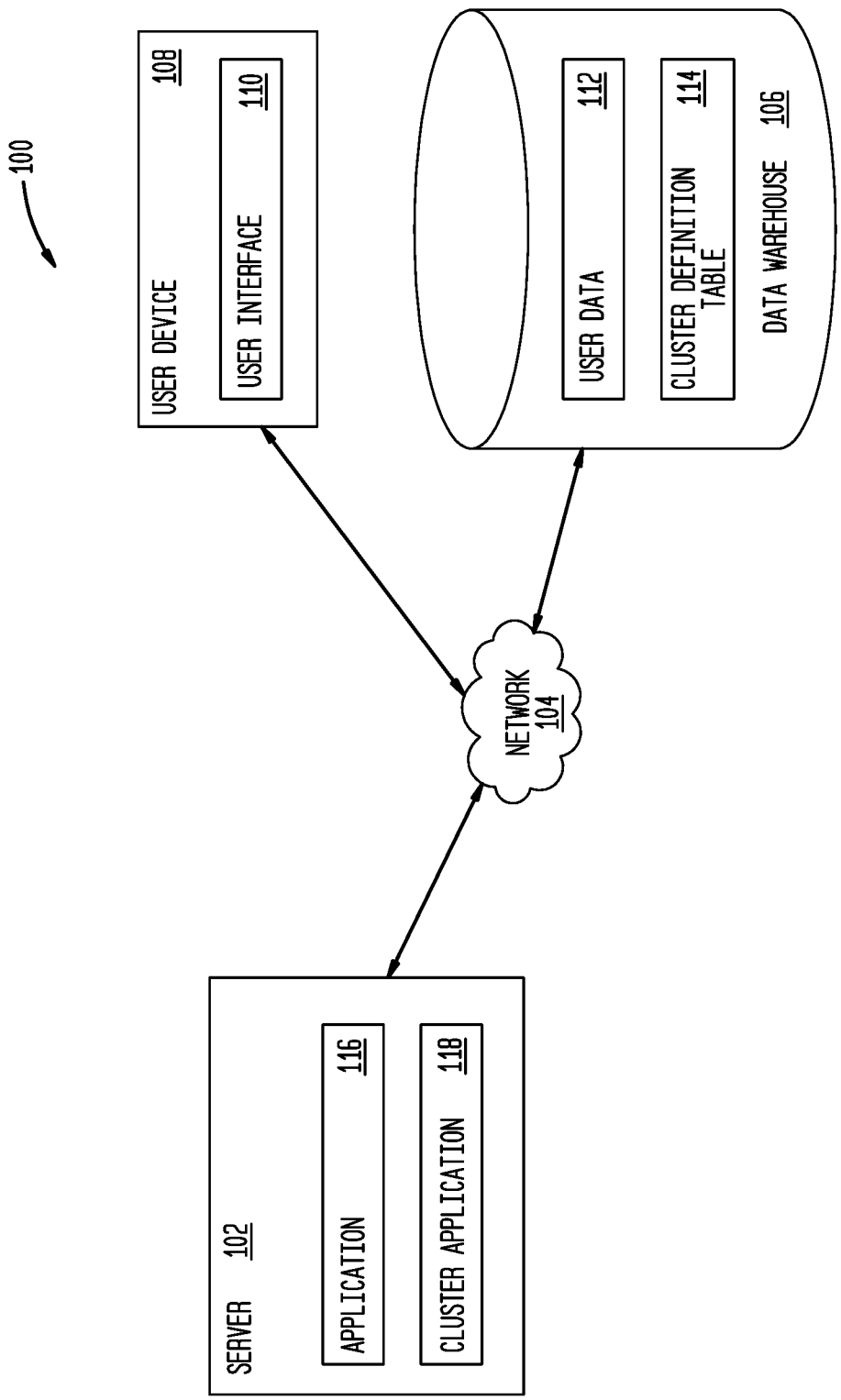
FIG. 1 illustrates a computing environment, according to one embodiment.

FIG. 1 illustrates an example of a computing environment 100 for forming clusters, pruning clusters, searching for a suitable cluster(s), and associated a user with a cluster(s), according to one embodiment. As illustrated, computing environment 100 includes a user device 108, a server 102, and a data warehouse 106. In some embodiments, components of one or more of these different devices (e.g., server 102 and data warehouse 106) may be included within a single device.

The user device 108 may comprise a computing device such as a desktop or laptop computer, server, mobile phone, tablet computer, or the like. User device 108 contains a user interface 110, which may allow input of a specific user's profile. In some embodiments, user interface 110 also allows a user to view results from an application 116 that has analyzed the user's profile, statistics, and clusters.

Server 102 may include a computing device such as a rack server, desktop or laptop computer, mobile phone, tablet computer, or the like. Server 102 includes an application 118, which may form clusters from data in the data warehouse 106. In certain embodiments, application 116 may include a web service (e.g., a remotely hosted financial services application).

Data warehouse 106 may include a data storage entity such as a database (e.g., user data 112 and the cluster definition table 114), repository, distributed storage system, or the like. Data warehouse 106 may include source code (not shown), which may be the source code for application 116 and cluster application 118.

Figure 2:
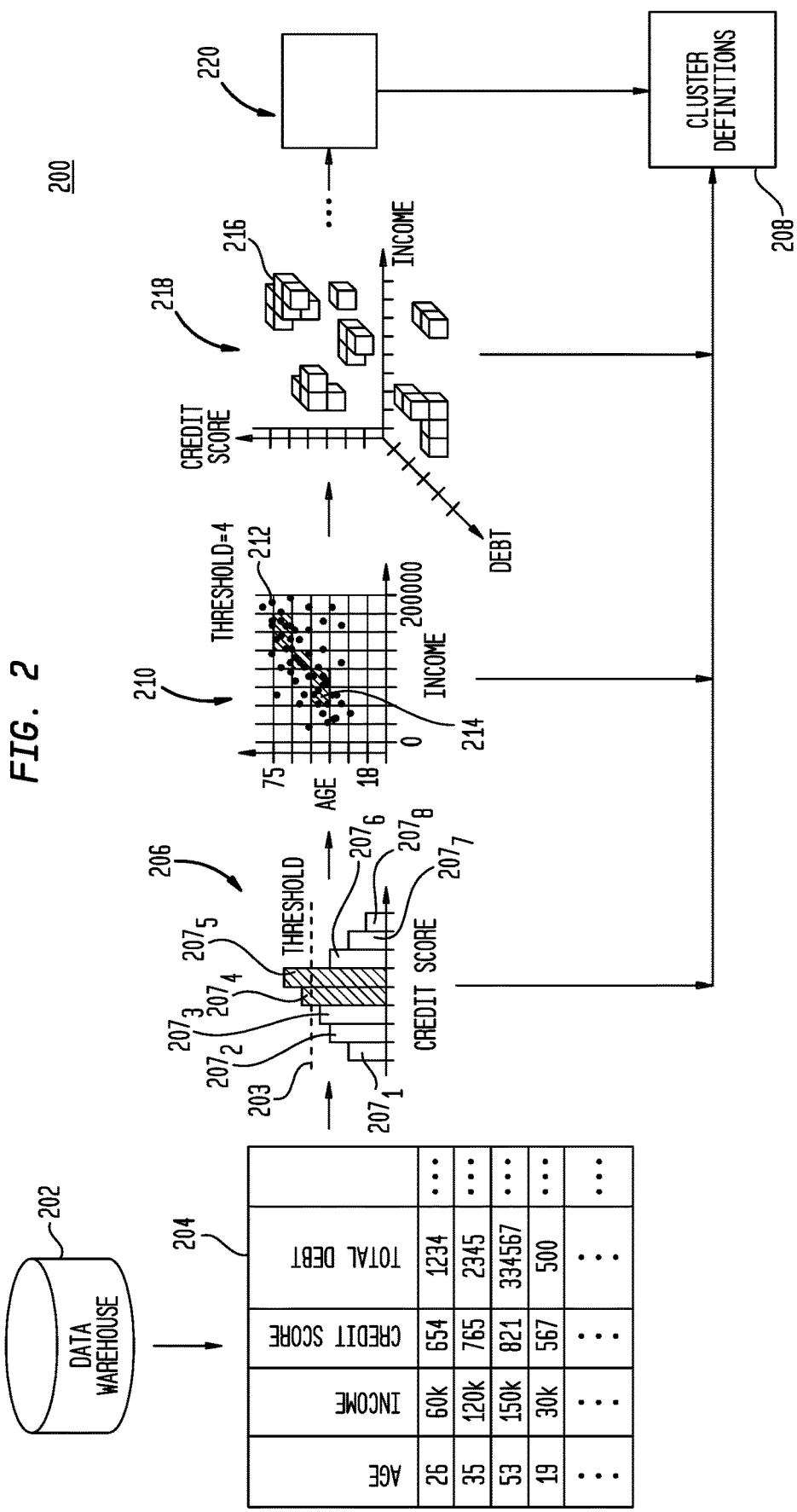
FIG. 2 illustrates a process for clustering data, according to one embodiment.

FIG. 2 illustrates an embodiment of a method 200 for clustering user data, such as user data stored in data warehouse 202. Data warehouse 202 is configured to store user data, statistics, personal financial data, credit report data, raw and derived tax data, small business data (e.g., invoices), self-reported data, usage data (e.g., beacon data indicating the user's click stream and interactions in the system), or other non-financial data.

The user data can include numerical data (e.g., a user's age) and/or categorical data (e.g., a user's marriage status (e.g., married, single, divorced), address, home ownership status (e.g., own or rent), etc.). In the case of categorical data, the data may be mapped to a numerical space (e.g., a binary response category may be mapped to a '1' and '0' in a numerical space). Sometimes the categorical data may be used to form numerical statistics despite being non-numerical data. For example, the number of responses or occurrences of a particular category (e.g., married) may be used to form a numerical statistic, such as 52% of the users are married.

Numerical and/or categorical data associated with a user may be stored within a user profile that includes a plurality of attributes.

While FIG. 2 depicts a single data warehouse 202 for simplicity, other embodiment may include a plurality of data warehouses, which may be in data communication with each other over data links, such as network connections.

Data from the data warehouse 202 can be extracted and placed in a matrix 204, or in some cases stored within data warehouse 202 in such a format. In this example, the matrix 204 includes "N" number of users (shown as individual rows in FIG. 2) and "D" number of dimensions (i.e., attributes or characteristics) of user data (shown as individual columns in FIG. 2). For example, the matrix 204 in FIG. 2 has four users such that N=four, and four data dimensions, such that D=four. Other embodiments may include fewer or more users and/or dimensions. Here, the four data dimensions for each user are: "AGE," "INCOME," "CREDIT SCORE," and "TOTAL DEBT".

In the embodiment depicted in FIG. 2, each dimension of the user data from data warehouse 202 is placed in a 1-Dimensional plot 206. Illustratively, the 1-Dimensional plot 206 depicts the "CREDIT SCORE" dimension, which is partitioned into eight bins (bins $207_1$, $207_2$, $207_3$, $207_4$, $207_5$, $207_6$, $207_7$, and $207_8$ (collectively "bins 207")). The bins each count the number of users falling within the range defined by the bin and the set of bins collectively count the number of users falling within the total range of the dimension. For example, here the range of the dimension "CREDIT SCORE" may be from 0 to 850.

In some embodiments, data dimensions are partitioned so that each bin has the same range in values (e.g., every bin is 10 units wide). In other embodiments, the bins 207 may have different respective ranges, for example, according to different statistical distributions. For example, the bins may be sized to account for, normalize, or otherwise affect a known statistical distribution of the underlying data. Thus, data occurring in, for example, a normal distribution may nevertheless be roughly equally distributed in bins whose ranges account for the distribution of the underlying data. In yet other embodiments, the bins 207 may have dynamic ranges that are adjusted based on one or more attributes of the underlying user data. For example, if the "CREDIT SCORE" data includes only scores between 500 and 800, the bins 207 may be dynamically adjusted to equally divide the actual range of the data (in this example, 500-800), rather than the possible range of the data (in this example, 0-850). As yet another example, the bins may be dynamically adjusted to account for high or low density groupings within the data. For example, when a particular bin exceeds a predetermined number of users falling within that bin, the bin may be subdivided dynamically to produce a more granular distribution within the high-density data. In some cases, dynamically adjusting bins may be done recursively until a desired states is reached, e.g., until a number of users falling within each bin, or a group of bins, is at a desired level. Dynamically adjusting the number of bins and ranges of bins may reduce the number of bins that were searched and further improve efficiency.

Threshold values may be set with respect to the number of users falling within bins 207 so as to define clusters of users. For example, 1-Dimensional plot 206 includes a substantially horizontal dashed line 203 indicating a threshold value (here, a threshold value of four) with respect to the number of users located in bins 207. In the 1-Dimensional plot 206, bins $207_4$ and $207_5$, exceed the threshold 203 and are thus labeled as 1-Dimensional clusters and are thereafter stored in a cluster definition table 208. The cluster definitions table 208 can be used to search and associate a user with a suitable cluster(s); and/or to compare specific data (e.g., AGE or INCOME) for the user to other users in the suitable cluster(s). As used herein, "suitable cluster" or "best cluster" is a cluster with the highest dimensionality (i.e., cluster that include the highest number of dimensions that are associated with a user).

This process of placing users into data dimension bins based on a respective value associated with the user for that data dimension can be repeated for each data dimension to form multiple 1-Dimensional clusters. For example, here the same process may be repeated for the "AGE", "INCOME", and "TOTAL DEBT" data dimensions, which results in 1-Dimensional cluster definitions for each of these data dimensions being stored in cluster definition table 208.

Two or more data dimensions may be compared against each other, e.g., plotted on orthogonal axes, such as shown in plot 210 with the "AGE" and "INCOME" data dimensions. In this way, clusters that include multiple dimensions may be formed (shown as hashed grid squares in FIG. 2) using a process similar to that of the 1-Dimensional clusters. Here again, clusters may be defined when more than a threshold number of users falls within any particular bin, such as a grid square in plot 210. For example, with respect to plot 210, when more than a threshold number of users fall into a grid square corresponding to a certain age and income level, a new 2-Dimensional cluster may be defined and thereafter stored in cluster definition table 208.

In some embodiments, the data used to form clusters is based on the clusters of a lower dimension. For example, points on plot 210 may correspond to 1-Dimensional bins that were found to have clusters (i.e. were found to include a number of users above a threshold) rather than to individual users' data. In this way, the clusters (e.g. 1-Dimensional clusters) may be used to define clusters having a higher dimensionality (e.g., 2-Dimensional clusters, and so-on).

The user data may include outliers, such as outliers 212, which are user data that are not part a cluster. In FIG. 2, data points, such as 212, falling outside the cross-hatched grid squares representing the clusters 214 are considered outliers.

The process may iterate through increasingly dimensional data in the same manner as described above. For example, plot 218 shows a 3-Dimensional example of user data clusters 216 plotted against three orthogonal axes, "CREDIT SCORE", "DEBT", and "INCOME." Notably, for simplicity, plot 218 does not show any outliers. As before, the 3-Dimensional clusters 216 are stored in the cluster definitions table 208.

Ultimately, the process may be repeated for each data dimension in the set of user data. Here, the process may be repeated for all four dimensions ("AGE", "INCOME", "CREDIT SCORE", and "TOTAL DEBT") at 220 before the process concludes.

Figure 3:
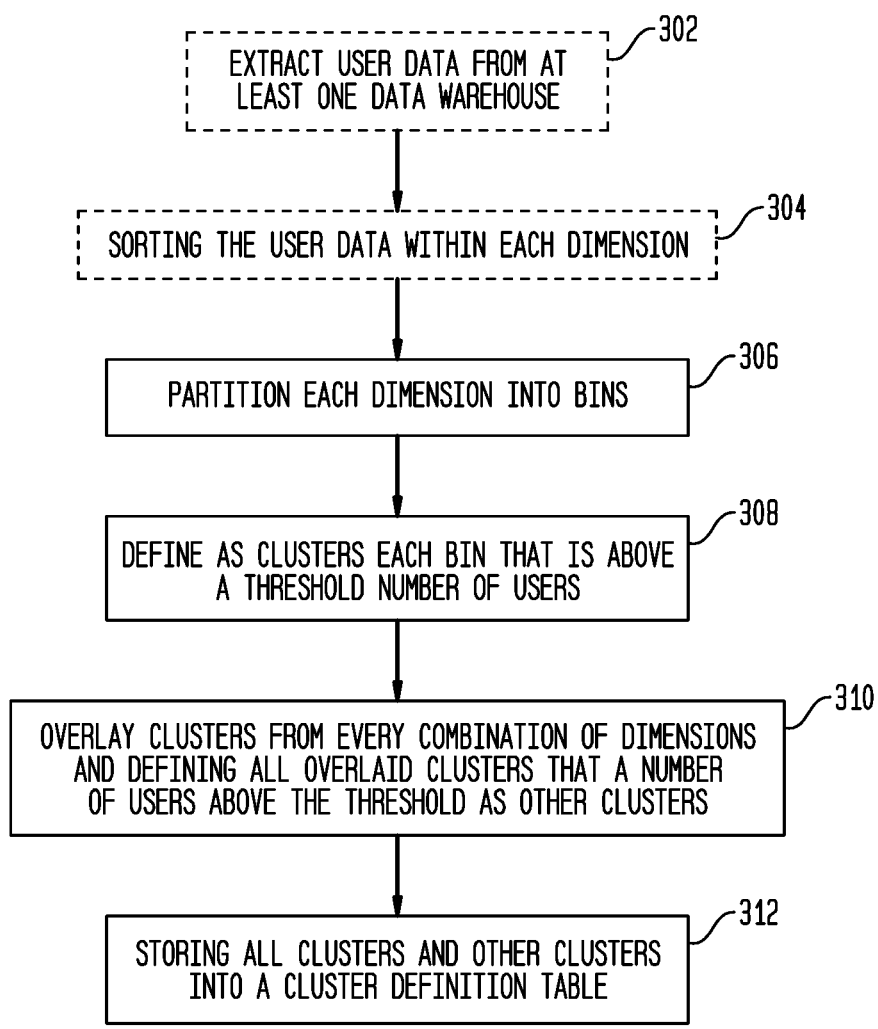
FIG. 3 illustrates a method of processing user data, according to one embodiment.

FIG. 3 illustrates an embodiment of a method 300 for clustering data. At 302, user data is extracted from at least one data warehouse. In some embodiments, the data warehouse may be a data repository, such as a relational database, stateless database, etc., which stores various types of user data. Notably, step 302 is indicated as optional by the broken line. In some cases, data may be present without needing to extract it from a data warehouse, such as where data is collected and stored in a volatile memory for immediate analysis, rather than being stored offline in a non-volatile memory for later analysis.

At 304, the user data is sorted within each dimension. For example, a user's age is sorted numerically within the AGE dimension so that, at 306, placement of the sorted data into appropriate bins is more efficient (i.e., faster). Likewise the user's income is sorted numerically within the INCOME dimension for faster placement into the appropriate bins. Sorting is just one type of pre-processing of user data stored in the data warehouse and others are possible as are known in the art. For example, data stored within the data warehouse may be normalized before being partitioned into dimensions. Further, while sorting is shown in step 304 as a step performed after extracting the data from a data warehouse, in other embodiments, the data may be processed (e.g., sorted) by the data warehouse itself. Accordingly, step 304 is indicated as optional by the broken line.

At 306, each of the data dimensions is partitioned into bins. As described above, the bins may be defined by ranges of data in each dimension that are defined in advance or dynamically based on the set of data in each dimension. User data may be placed in an appropriate bin based on its value. For example, a user with an age of 37 may be placed in a bin of data dimension "AGE" that includes values between 35 and 40.

At 308, the number of users in each bin may be compared to a threshold value, and each bin including a number of users greater than the threshold value may thereafter be defined as a "cluster." For example, if the threshold value is 10 and the bin for users with an age of 35 to 40 includes 13 users, then users in that bin may be defined as a cluster. Each cluster may thereafter be stored in a cluster definition repository, such as cluster definition table 208 in FIG. 2.

At 310, every combination of dimensions (that includes a cluster) is compared to form clusters of higher dimension. For example, all 1-Dimensional clusters may be compared and thresholds may be applied to form 2-Dimensional clusters, as described above with respect to FIG. 2. This process may be repeated to form clusters having higher dimensionalities. Clusters having relatively fewer dimensions may be considered to have low granularity with respect to users falling within those clusters while clusters having more dimensions may be considered to have high granularity with respect to users falling within those clusters.

At 312, all clusters are stored in a cluster definition table, such as table 208 in FIG. 2.

A user may be associated with multiple clusters having the same dimensionality or multiple clusters having different dimensionalities.

Figure 4:
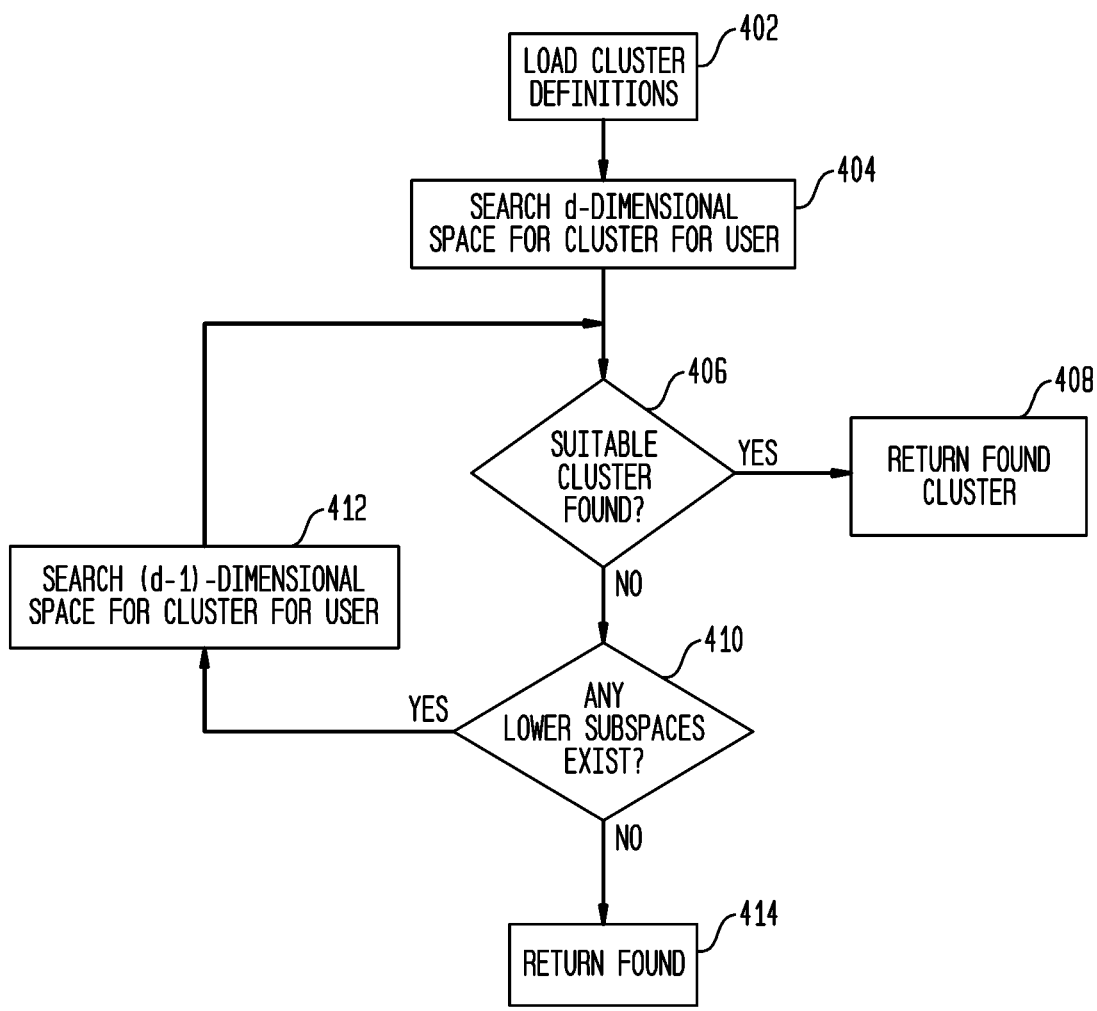
FIG. 4 illustrates a method of associating a user with a cluster, according to one embodiment.

FIG. 4 illustrates an example of an embodiment for associating a user with one or more suitable cluster(s). At 402, a cluster definitions table (such as table 208 in FIG. 2) is accessed by an application. At 404, the clusters are searched to which clusters are associated with a particular user. The search begins with the clusters having the highest dimensionality and proceeds through the clusters with the lowest dimensionality.

In one embodiment, the application may prune, remove, or otherwise ignore clusters from the total set of defined clusters, such as the total set of cluster definitions in table 208 of FIG. 2. Thereafter, the remaining clusters may be searched for association with a particular user based on one or more criteria. For example, the criteria may relate to values or ranges of values within one or more data dimensions that are associated with a user.

For example, search criteria may actively omit clusters associated with certain data dimensions (e.g., TOTAL DEBT), such that clusters including those dimensions can be pruned prior to searching the remaining clusters for an association with a particular user. Pruning the total set of clusters prior to searching for clusters having an association with a user reduces the potentially relevant data set, which improves the performance of the device processing the data (e.g., by making the search faster and less processor intensive).

The application may sometimes include dimensions as search criteria even when those dimensions are not present in the user's data. For example, the INCOME dimension can be made part of the search even though a particular user has not provided that data. In such cases, even though a particular user may not be associated with INCOME data, the clusters resulting from a search that included the INCOME dimension may provide information about other users in those clusters to be compared to the particular user.

At 406, a search is performed (e.g., via a structured query) to determine whether one or more suitable cluster(s) is found, where a suitable cluster may be a cluster associated with a user. If found, the suitable one or more suitable clusters are provided to the application. If, however, no suitable clusters are found at a particular level of dimensionality, then at 410 another search determines whether there are any suitable clusters at a lower dimensionality left to be searched. If at 410, there are no clusters left to be searched, then an indication of such is provided to the application.

If there are more clusters that can be searched at step 410, the process proceeds to step 412 where clusters meeting the application criteria and having the lower dimensionality are searched. For example, if at step 406 there are no 3-dimensional clusters that are suitable, then at step 410 it may be determined that there are 2-dimensional clusters to be searched. After all of the clusters in the lower dimensionality have been searched, the method proceeds to element 406 as described above. Elements 406, 410 and 412 form an iterative loop that searches clusters at descending levels of dimensionality. If no suitable clusters have been found and there are no more clusters left to search, at 414 an indication that no suitable cluster has been found is provided to the application.

Figure 5:
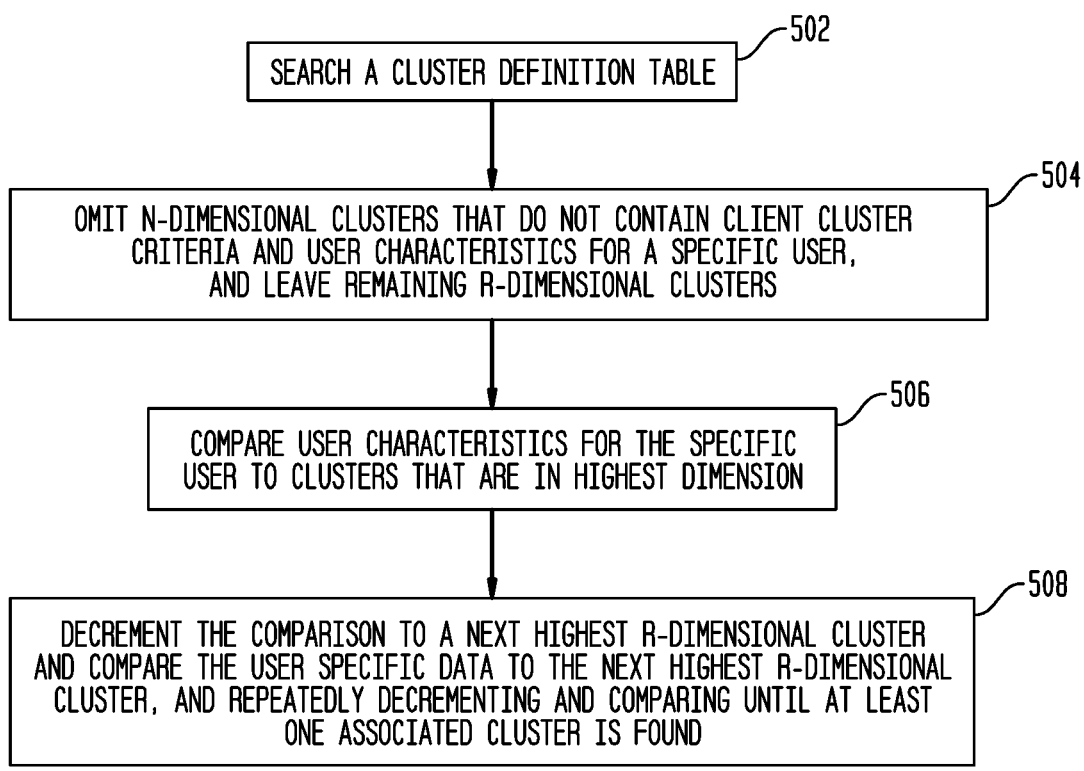
FIG. 5 illustrates a method of associating a user with a cluster, according to one embodiment.

FIG. 5 illustrates an embodiment of a method 500 for associating a user with a cluster. At 502, a cluster definition table is searched for clusters associated with a particular user. At 504, search criteria are used to prune clusters in every dimensionality that are not relevant to the search criteria. After pruning, any clusters that remain are available for a comparison at 506.

At 506, a user's characteristics are compared to the one or more remaining clusters having the highest dimensionality. If no clusters are found that can be associated with the user, then the method 500 proceeds towards 508. At 508, the comparison proceeds in a decremented fashion to the clusters that remain and have progressively lower dimensionality. If no suitable clusters are found, then the search will continue descending in dimensionality until one or more suitable clusters are found, or until there are no more clusters left to search.

Although, a user can be associated with multiple clusters, there are methods for deciding which cluster to associate with a user. For example, a user may have a dimension (e.g., credit score or credit card debt) that is below average in one cluster, but above average when in a different cluster. In an embodiment, a decision may be made to put the user either cluster depending on the purpose of the search. For example, if the purpose of the search was to determine clusters where the user was above average in one dimension, then the appropriate cluster may be chosen.

Figure 6:
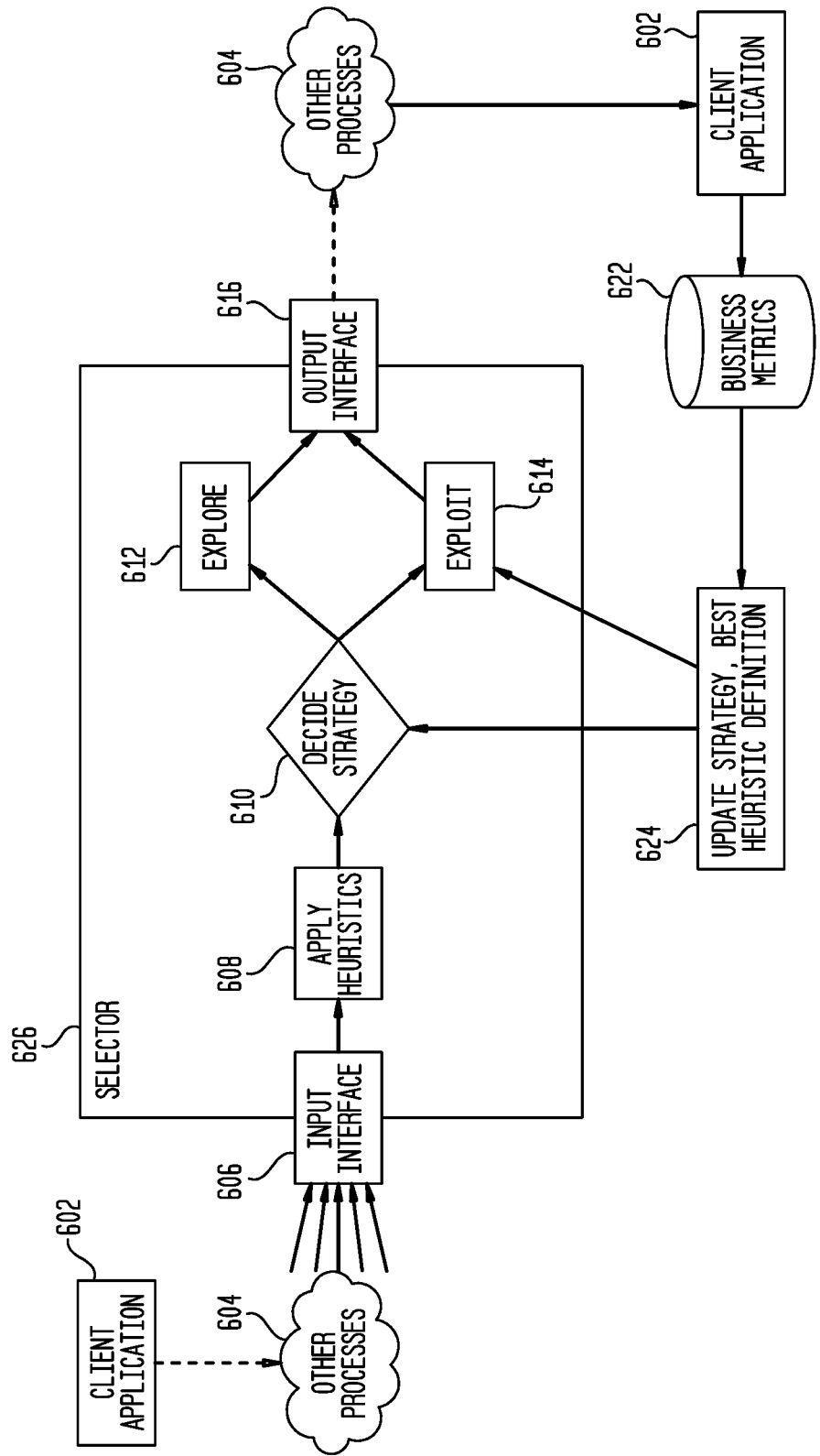
FIG. 6 illustrates a method for heuristically associating a user with a cluster, according to one embodiment.

FIG. 6 illustrates an embodiment of a method 600 for heuristically associating a user with a cluster. A client application 602 initiates the process of finding a cluster for a user and acts as an interface between the client and the overall system. In various embodiments the client application may be a web application, a mobile phone application, or a traditional application running on a device or hosted by a server, or some sort of personal finance application.

At 604, there are other processes that occur such as for example, a network call that comes from the client application 602 to a client application 606 via other processes 604 (e.g., routing, security and authentication that occur within a system). The clustering process described above may be considered an "other process" as depicted at 604.

The client application 606 is used to transmit the user's profile data (e.g., credit score, income and zip code), clustering data, and context data (i.e., data that provides information indicating the user's location in an application process) to a Cluster Statistic Selector 626 via an input interface 606. Clusters from the cluster dimension table 208 are also received via the input interface 606.

A user may be associated with more than one cluster. When the user is associated with multiple clusters heuristics 608 are applied to the clusters. For example, a heuristic may score and select a cluster based on the number of users in that cluster. As another example, another heuristic may score a cluster based upon whether it has one or more statistics that is closest to the user's profile data. For example, if the user has a certain credit score and the statistic is average credit score, then the heuristic may select the cluster that has the smallest distance between the user's credit score and the average credit score.

At 610, a determination is made whether to explore 612 when there more information needed or exploit 614 when there is enough information already.

At 614 a decision is made regarding which heuristic to apply. At 616, an output interface receives the decision made at 614 and transmits that information to the client application 602 via the other processes 604.

At 624 the heuristic that is the most applicable to the user (based upon user feedback provided in 602) is selected and is used later at exploit 614 transmitted towards 614 as the heuristic to use next. For example, if at 624 it is determined that the heuristic with the most users in the cluster is the most appropriate to use, then that information is used at 614 for selection of that heuristic until there is an update. For example, when the program is first run, there is no client application data. The system chooses a heuristic from a group of heuristics because it has to learn more (i.e., have more data). As the program is run more times enough data will eventually be acquired where exploit 614 is selected rather than explore 612. When there is enough data, 624 instructs to select exploit 614. Thus 610 acts as a dial that determines what percentage exploit 614 and explore 612 are selected, and 624 tunes (adjusts the percentage) that dial based upon the information in the business metrics 622.

The business metrics 622 tracks usage (also referred to herein as "beaconing") by a usage. For example, as a user proceeds through the application process they leave a click stream of their selection(s)/interactions that get stored in the business metrics 622 (both in a raw form and in a derived form). In some embodiments, a business metric database 622 may track and receive the selected cluster and statistic as well. The business metric database 622 may be used to build a training process. The training process is used to update the strategy that that was used by the heuristic. The training process draws data from the business metric, analyzes it, and comes up with a new strategy or new set of strategies that will then be loaded as a file at the run-time. In addition, 622 and 624 are off-line processes as opposed to the other processes depicted in FIG. 6 which are real-time processes. 624 is a periodic process (e.g., daily or weekly) that is used to update the exploit 614 process.

Figure 7:
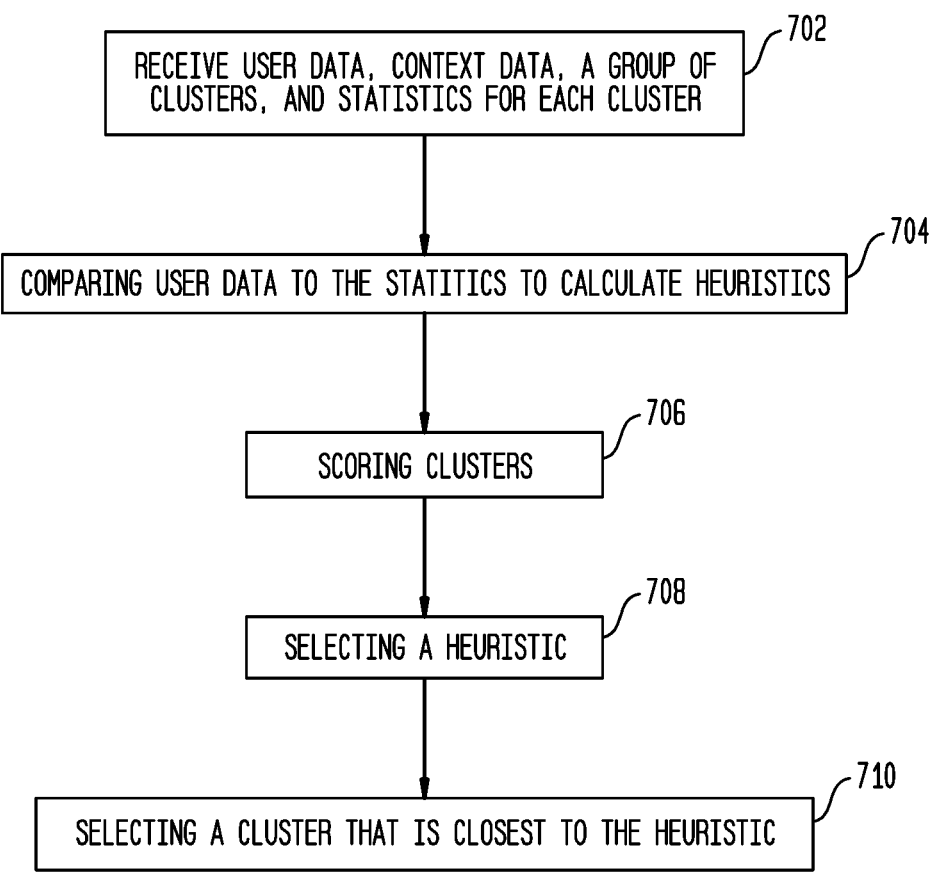
FIG. 7 illustrates a method for heuristically selecting a cluster for the user, according to one embodiment.

FIG. 7 illustrates example operations 700 for heuristically selecting a cluster for the user. At 702, user data, context data, and clusters for those clusters are received. At 704, the user data is compared to context data, clusters and other data to determine which heuristic to use. At 706, the clusters are scored based upon some criteria. For example, when the user is in multiple clusters a heuristic can give the cluster with the most number of users a higher than the cluster having a fewer number of users. At 708, a heuristic is selected and at 710 a cluster is selected for association with the user that is closest to the selected heuristic.

Figure 8:
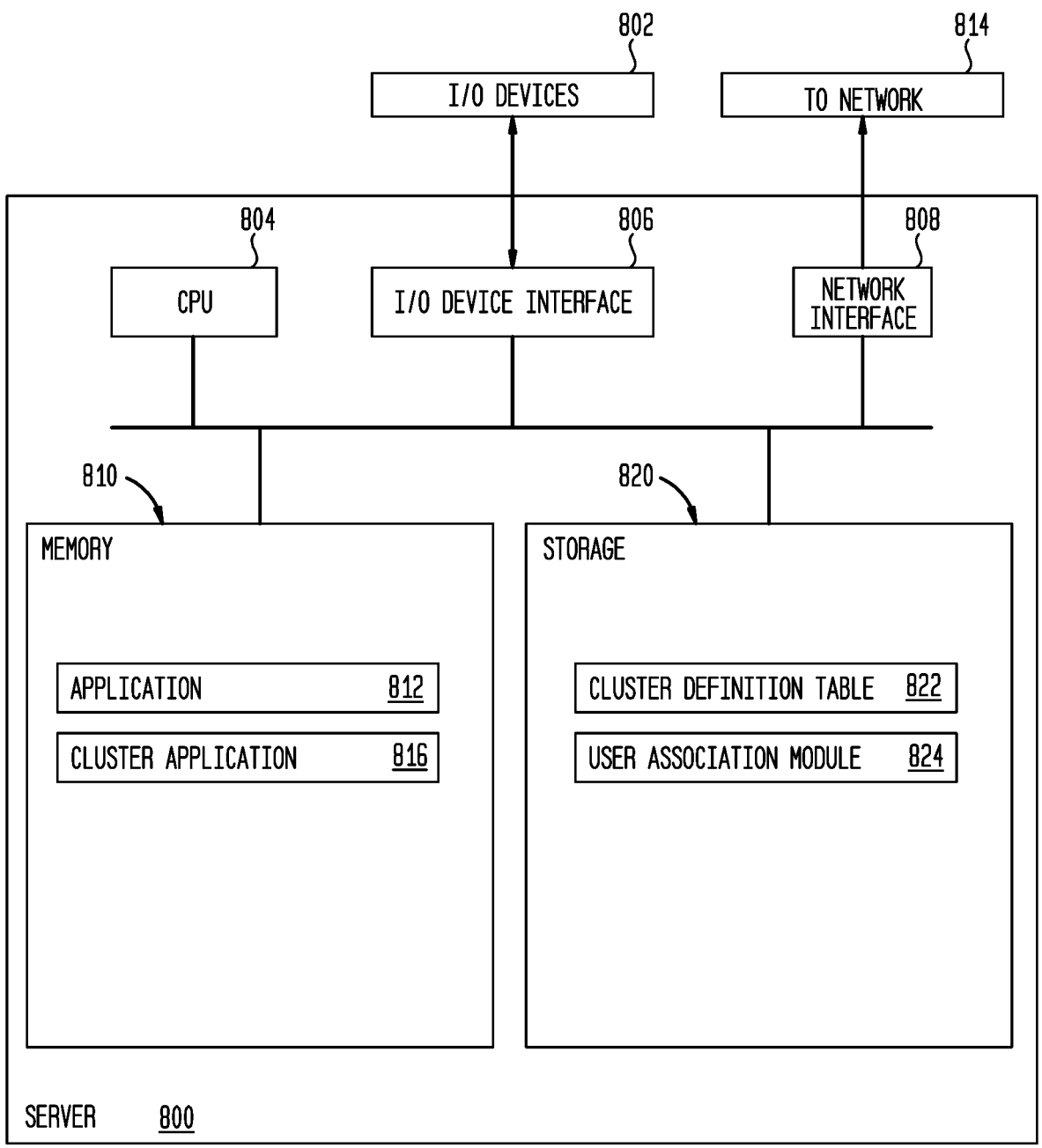
FIG. 8 illustrates a computing system for performing clustering and utilizing that clustering, according to one embodiment.

FIG. 8 illustrates an example computing system 800 for forming a cluster dimensions table and for associating a user with a cluster clustering, according to embodiments of the present disclosure. As shown, the system 800 includes, without limitation, a central processing unit (CPU) 804, one or more I/O device interfaces 806 which may allow for the connection of various I/O devices 802 (e.g., keyboards, displays, mouse devices, pen input, etc.) to the system 800, network interface 814, a memory 810, storage 820, and an interconnect 818.

CPU 804 may retrieve and execute programming instructions stored in the memory 810. Similarly, the CPU 804 may retrieve and store application data residing in the memory 810. The interconnect 818 transmits programming instructions and application data, among the CPU 804, I/O device interface 806, network interface 808, memory 810, and storage 820. CPU 804 is included to be representative of a single CPU, multiple CPUs, a single CPU having multiple processing cores, and the like. Additionally, the memory 810 is included to be representative of a random access memory. Furthermore, the storage 820 may be a disk drive, solid-state drive, or a collection of storage devices distributed across multiple storage systems. Although shown as a single unit, the storage 820 may be a combination of fixed and/or removable storage devices, such as fixed disc drives, removable memory cards or optical storage, network attached storage (NAS), or a storage area-network (SAN).

As shown, memory 810 includes an application 812, which may comprise a web service (e.g., a remotely hosted financial services application), which may execute REST requests and return REST responses. Memory 810 further includes a cluster application module 816, which forms clusters from users' data and finds a cluster(s) to associate a single user (and is described above with respect to FIGS. 1-7). The components in memory 810 may communicate with other devices over network 814 through network interface 808.

In one embodiment, the system utilizes a method that receives new user data, context data, clusters and statistics for the clusters. The method compares the new user data to the statistics to calculate heuristics for each of the clusters and scores the clusters based upon at least one of the statistics and the user data. A heuristic is selected and then a cluster is selected that is closest to the selected heuristic.

In another embodiment, a system is provided that includes a processor; and a memory storing instructions, which, when executed by the processor, performs a method for selecting a cluster for a specific user. The system searches a cluster definition table having clusters for at least one associated cluster in a highest dimension for association with a specific user. The search includes omitting clusters that do not contain client cluster criteria and user characteristics for the specific user, and leaving remaining clusters. The search compares user characteristics for the specific user to clusters that are in a dimension that is equal to a cluster in a highest dimension that contains the user characteristics and indicating that the at least one associated cluster is found when user specific data is within the cluster having the highest dimensionality. The search decrements the comparison, of the user specific data down to clusters having a next highest dimensionality and comparing the user specific data to clusters in the next highest dimension, wherein the decrementing is repeatedly done until the at least one associated cluster is found.

In yet another embodiment, a computer-implemented method for processing data includes receiving user data, context data, a group of clusters, and statistics for each cluster in the group of clusters. The method compares user data to the statistics to calculate heuristics for each cluster in the group of clusters and scores clusters based upon at least one of the statistics and the user data. A heuristic is selected and a cluster is selected that is closest to the selected heuristic.

The method may further include transmitting the selected heuristic, the selected cluster and statistics for the selected cluster to a client application. In one embodiment, the method also includes analyzing the selected heuristic, the selected cluster and statistics for the selected cluster to a client application; updating a learned heuristic based upon the analysis; and replacing the selected heuristic with the learned heuristic.

The user data and the context data may be received from a client application. The context data may provide an indication of at least one of a user's location in an application process and an indication of where the user data was inserted in the application process.

In yet another embodiment, a system includes a processor; and a memory storing instructions, which, when executed by the processor, performs a method for clustering user data. The system receives user data, context data, a group of clusters, and statistics for each cluster in the group of clusters and compares user data to the statistics to calculate heuristics for each cluster in the group of clusters. Clusters are scored based upon at least one of the statistics and the user data. A heuristic is selected and a cluster is selected that is closest to the selected heuristic.

The method utilized by the system may further include transmitting the selected heuristic, the selected cluster and statistics for the selected cluster to a client application. The method may also analyze the selected heuristic, the selected cluster and statistics for the selected cluster to a client application; update a learned heuristic based upon the analysis; and replace the selected heuristic with the learned heuristic. In one embodiment, the context data provides an indication of at least one of a user's location in an application process and an indication of where the user data was inserted in the application process.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the terms "having," "containing," "including," "comprising" and the like are open ended terms that indicate the presence of stated elements or features, but do not preclude additional elements or features. The articles "a," "an," and "the" are intended to include the plural as well as the singular, unless the context clearly indicates otherwise.

While the foregoing is directed to embodiments of the present disclosure, other and further embodiments of the disclosure may be devised without departing from the basic scope thereof, and the scope thereof is determined by the claims that follow.

We claim:

1. A computer-implemented method for processing data, comprising:
    partitioning, into a plurality of bins, user data for each dimension in a plurality of dimensions, wherein the plurality of dimensions includes a maximum number of dimensions;
    storing clusters for each dimension into a cluster definitions table;
    adding, incrementally, a number of dimensions that are combined, and identifying every combination of clusters above a threshold, wherein a given number of dimensions in each given combination of clusters defines a dimensionality of the given combination of clusters;
    partitioning, into bins, each combination;
    defining, as clusters, bins that include the user data that exceeds the threshold;
    storing the clusters in the cluster definitions table;
    searching the cluster definitions table for at least one associated cluster in a highest dimension for association with a specific user, wherein the searching comprises:
        omitting clusters that do not contain client cluster criteria and user characteristics for the specific user, and leaving remaining clusters;
        performing a comparison of user characteristics for the specific user to clusters that have a highest level of dimensionality that contains the user characteristics and indicating that the at least one associated cluster is found when user specific data is within a remaining cluster having the highest dimensionality; and
        decrementing the comparison of the user specific data down to a cluster having a next highest dimensionality and comparing the user specific data to clusters having a next level of dimensionality wherein the decrementing is repeatedly done until the at least one associated cluster is found.

2. The computer-implemented method of claim 1 wherein the bins are partitioned into a predetermined number of bins.

3. The computer-implemented method of claim 1 wherein the bins are partitioned based upon a distribution of the user data.

4. The computer-implemented method of claim 1, further comprising extracting the user data from at least one data warehouse prior to partitioning the user data.

5. The computer-implemented method of claim 1 wherein the user data is at least one of: categorical values; or numerical values.

6. The computer-implemented method of claim 1, further comprising:
    receiving new user data, context data, clusters and statistics for the clusters;
    comparing the new user data to the statistics to calculate heuristics for each of the clusters;
    scoring the clusters based upon at least one of the statistics and the user data;
    selecting a heuristic; and
    selecting an cluster that is closest to the selected heuristic.

7. A system, comprising:
    a processor; and
    a memory storing instructions, which, when executed by the processor, performs a method for clustering user data, comprising:
        partitioning, into a plurality of bins, user data for each dimension in a plurality of dimensions;
        storing clusters for each dimension into a cluster definitions table;
        adding, incrementally, a number of dimensions that are combined, and overlaying every combination of clusters,
        wherein a given number of dimensions in each given combination defines a dimensionality of the given combination;
        partitioning, into bins, each combination;
        defining, as overlaid clusters, bins that include the user data that exceeds a threshold;
        storing the overlaid clusters in the cluster definitions table; and
        searching the cluster definitions table for at least one associated cluster in a highest dimension for association with a specific user, wherein the searching comprises:
            omitting clusters that do not contain client cluster criteria and user characteristics for the specific user, and leaving remaining clusters;
            performing a comparison of user characteristics for the specific user to clusters that have a highest level of dimensionality that contains the user characteristics and indicating that the at least one associated cluster is found when user specific data is within a remaining cluster having the highest dimensionality; and
            decrementing the comparison of the user specific data down to a cluster having a next highest dimensionality and comparing the user specific data to clusters having a next level of dimensionality wherein the decrementing is repeatedly done until the at least one associated cluster is found.

8. The system of claim 7, wherein the method further comprises the bins partitioned into a predetermined number of bins.

9. The system of claim 7, wherein the method further comprises the bins partitioned based upon a distribution of the user data.

10. The system of claim 7, wherein the method further comprises extracting the user data from at least one data warehouse prior to partitioning the user data.

11. The system of claim 7, wherein the user data is at least one of categorical values and numerical values.

12. The system of claim 7, wherein the method further comprises:
receiving new user data, context data, clusters and statistics for the clusters;
comparing the new user data to the statistics to calculate heuristics for each of the clusters;
scoring the clusters based upon at least one of the statistics and the user data;
selecting a heuristic; and
selecting an cluster that is closest to the selected heuristic.

13. A computer-implemented method for processing data, comprising:
partitioning, into a plurality of bins, user data for each dimension in a plurality of dimensions, wherein the plurality of dimensions includes a maximum number of dimensions;
storing clusters for each dimension into a cluster definitions table;
adding, incrementally, a number of dimensions that are combined, and identifying every combination of clusters above a threshold, wherein a given number of dimensions in a given combination defines a dimensionality of the given combination;
partitioning, into bins, each combination;
defining, as clusters, bins that include the user data that exceeds the threshold;
storing the clusters in the cluster definitions table;
receiving new user data, context data, clusters and statistics for the clusters;
comparing the new user data to the statistics to calculate heuristics for each of the clusters;
scoring the clusters based upon at least one of the statistics and the user data;
selecting a heuristic; and
selecting an cluster that is closest to the selected heuristic.

14. The computer-implemented method of claim 13, wherein the bins are partitioned into a predetermined number of bins.

15. The computer-implemented method of claim 13, wherein the bins are partitioned based upon a distribution of the user data.

16. The computer-implemented method of claim 13, further comprising extracting the user data from at least one data warehouse prior to partitioning the user data.

17. The computer-implemented method of claim 13, wherein the user data is at least one of: categorical values; or numerical values.

18. The computer-implemented method of claim 13, further comprising:
searching the cluster definitions table for at least one associated cluster in a highest dimension for association with a specific user, wherein the searching comprises:
omitting clusters that do not contain client cluster criteria and user characteristics for the specific user, and leaving remaining clusters;
performing a comparison of user characteristics for the specific user to clusters that have a highest level of dimensionality that contains the user characteristics and indicating that the at least one associated cluster is found when user specific data is within a remaining cluster having the highest dimensionality; and
decrementing the comparison, of the user specific data down to a cluster having a next highest dimensionality and comparing the user specific data to clusters having a next level of dimensionality wherein the decrementing is repeatedly done until the at least one associated cluster is found.

* * * * *